United States Patent [19]

Beer

[11] Patent Number: 5,000,969
[45] Date of Patent: Mar. 19, 1991

[54] PROCESS FOR PRODUCING COMPOSITE FROZEN CONFECTION PRODUCTS

[75] Inventor: Richard Beer, Nuremberg, Fed. Rep. of Germany

[73] Assignee: Schöller Lebensmittel GmbH & Co. KG, Nuremberg, Fed. Rep. of Germany

[21] Appl. No.: 418,679

[22] Filed: Oct. 10, 1989

[30] Foreign Application Priority Data

Oct. 10, 1988 [DE] Fed. Rep. of Germany ....... 3834461

[51] Int. Cl.$^5$ .............................................. A23G 9/00
[52] U.S. Cl. ................................... 426/101; 426/517; 426/565
[58] Field of Search ................ 426/89, 100, 101, 274, 426/515, 516, 517, 565

[56] References Cited

U.S. PATENT DOCUMENTS 4,542,028 9/1985 Butcher et al. ..................... 426/101

Primary Examiner—George Yeung
Attorney, Agent, or Firm—Scully, Scott, Murphy & Presser

[57] ABSTRACT

In a process for producing composite confection products, comprising a plurality of superimposed confection layers formed from extruded strands, in particular of ice cream, of which at least one is wave-shaped and may overlap itself, the confection layers are extruded on to a conveyor belt and to produce the wave shape the component of movement of the extruded material is greater than the movement of the conveyor belt so that at least a first point of deposition of the leading end of the strand issuing from at least one extrusion nozzle is displaced laterally relative to the vertical movement of the extrusion strand from the outlet to the plane of deposition of the conveyor belt so that the pasty confection material is deposited laterally under its own weight due to a lateral displacement of the center of gravity of the strand, and that the conveyor belt is displaced laterally at the latest when at least one loop comprising at least two superimposed strand sections has been formed.

A composite confection product produced according to the process is also described.

15 Claims, 2 Drawing Sheets

PROCESS FOR PRODUCING COMPOSITE FROZEN CONFECTION PRODUCTS

TECHNICAL FIELD OF THE INVENTION

The invention relates to a process for the manufacture of composite confection products consisting of a plurality of superimposed layers formed from extruded strands of confection, in particular ice cream, of which at least one is in the form of a wave and may overlap itself, wherein the confection layers are extruded on to a conveyor belt and wherein to produce the wave form the component of movement of the material being extruded is greater than the movement of the conveyor belt. The invention also includes a composite confection product produced by this process.

BACKGROUND OF THE INVENTION AND PRIOR ART

A process of the kind mentioned above is known from DE-PS 32 31 560. For the manufacture of a confection product with layers which have surfaces other than flat ones and overlap themselves at least one of the extrusion nozzles is continuously pivoted back and forth so that the desired form of the layers is obtained.

A process for the manufacture of a confection material with superimposed layers of which at least one is in the form of a wave and in which adjacent sections of the layer may even overlap is known from DE-PS 34 36 578. The individual layers are extruded from stationary extrusion nozzles on to a conveyor belt moved at a constant speed. In this case the extrusion speed is higher than the speed of the conveyor belt, and the desired effect is produced by the higher extrusion speed causing the confection material to pile up into mountains.

The known processes are relatively expensive and require control and regulating units to produce the desired layers. In DE-PS 32 31 560 an additional drive is needed for pivoting the extrusion nozzles. While the process described in DE-PS 34 36 578 does produce a confection product having piled-up mountains or waves, the difference between the extrusion speed and the speed of the conveyor belt must always be taken into consideration so that the desired form of the layers is obtained.

OBJECT OF THE INVENTION

It is an object of the invention to simplify the process mentioned in the introduction and to use the rheological properties of the confection material itself to prepare a confection product with wave-shaped layers.

SUMMARY OF THE INVENTION

This object is achieved in a surprisingly simple way if at least one first point of deposition on the conveyor belt of the leading end of the strand issuing from at least one extrusion nozzle is displaced laterally relative to the vertical discharge movement of the extrusion strand, and the pasty confection material, because of a lateral displacement of the centre of gravity of the strand, is deposited under its own weight laterally on to the conveyor belt or on to already deposited strand sections, and that the conveyor belt is displaced laterally at the latest when at least one loop comprising at least two superimposed strand sections has been formed.

The invention is further developed by the features in the subclaims.

The advantages obtained by means of the invention can essentially be seen in that in a surprisingly simple manner extrusion strands are deposited on to a conveyor belt that is in a quasi stationary state due to a lateral displacement of the centre of gravity, so that the effect according to the invention occurs almost independently of the speed of the conveyor belt and independently of the difference between the speed of the material being extruded and that of the conveyor belt and is independent of the nature of the surface of the conveyor belt, which in known processes (DE-PS 34 36 578) carries the extrusion strand along with it. Depositing the extrusion strand according to the invention also avoids piling up the pasty confection material to form waves or mounds.

The process according to the invention enables extrusion to be performed directly on to flat trays, for example thermally formed trays of plastics material having a circumferential ridge, instead of on to the conveyor belt itself.

According to the invention, after establishing a first point of deposition of the issuing extrusion strand on to the conveyer belt, the conveyor belt is displaced laterally stepwise by the width (l) of the first loop (see FIGS. 2 and 3). The distance (l) can be influenced by the speed of extrusion, the frequency of the lateral displacement of the conveyor belt and the rheological properties of the confection material. The distance (l) can be changed by varying these conditions.

Furthermore, the conveyor belt can be displaced at the latest when more than two loops have been deposited. In one important embodiment the loops are deposited continuously on to the conveyor belt so that they overlap themselves, with the loops extending in a plane of a confection layer being formed from one and the same strand. In order to obtain a multilayered confection product the loop and/or loops extending in the plane of each confection layer are deposited in superimposed confection layers which overlap one another.

By meeting the requirements of the process according to the invention it is possible, without the need for other measures, to make the extruded strands of ice cream thicker than 5 mm and to form the strands, as desired, from dairy ice cream, water ice or from varieties of dairy ice cream that have been deliberately enriched in air by beating. The aerated, frozen layers of confection material can however equally well have a layer thickness of less than 5 mm.

All process embodiments of the invention contribute to the production of a markedly improved and more advanced end product, with the characteristics of the resulting confection product being substantially determined by the process. If a layer of confection material of a different kind is deposited parallel to and adjacent to each wave-shaped layer the quantity of non-ice cream substances in the confection material can be increased considerably. As a result of the relatively high content of these substances little burden is imposed on the tongue and stomach.

By means of the process according to the invention a composite frozen confection product having a plurality of superimposed layers of frozen confection material is produced which can have intermediate layers of other kinds of confection material e.g. fat-based materials such as couverture, chocolate frosting, nougat and/or loose, unevenly distributed confection material such as chocolate chips and the like arranged between adjacent layers thereof. Furthermore the confection product produced according to the invention is characterised in that the flat strands preferably have a rectangular or a star-shaped or round or like cross-section, the strands are deposited as loops in the form of waves going back and forth which extend in the plane of each confection layer, with the waveshaped loops of the strands in superimposed confection layers being laid down so that they overlap one another.

Suitable embodiments of the confection product according to the invention are characterised in the subclaims 8 to 13.

This confection product according to the invention is not only characterised by a particular appearance but in particular provides a novel and special eating experience.

The aerated, frozen confection material can for example be ice cream.

If the shaped body is to consist of a single continuously deposited strand, the apparatus for producing the proposed composite confection product is provided with only a single nozzle, which may be adjustable vertically away from the base so as to adapt to the increasing height of the confection material. To achieve the effect according to the invention it is not necessary to move the extrusion nozzle back and forth.

With an apparatus of this kind the proposed confection product can be prepared economically and quickly. Ice cream pre-frozen in the usual way is supplied to the nozzle at a temperature of for example −5° to −10° C. A suitable tray of cardboard, plastics material, biscuit or the like may serve as the base for the confection product. As already mentioned above, an apparatus is used in which the single nozzle or a plurality of nozzles side by side is or are arranged on a fixed support plate with the outlet opening or openings downwards, in which the or each nozzle is connected via a line to a distributor head and in which a moveable base for the extrudate is arranged beneath the nozzle or nozzles, as is known from DE-PS 34 36 578. For producing the composite confection product according to the invention a first point of deposition of the leading end of the strand issuing from the extrusion nozzle or nozzles is displaced laterally relative to the vertical movement of the extrusion strand from the outlet to the base and to that of the conveyor belt, so that the pasty confection material is deposited laterally under its own weight owing to lateral displacement of the centre of gravity of the strand. The conveyor belt is continuously laterally displaced at an extremely low speed at the latest as soon as at least one loop with at least two superimposed strand sections has been formed. In this way a first layer of ice cream extrudate is deposited on the substrate. The substrate is then advanced stepwise and a second nozzle device is brought into use. While the second nozzle device is applying the second layer of strands of extrudate, a fresh base plate is pushed beneath the first nozzle device and there the process is started from the beginning. In this way, with a production line that can be extended at will, a multilayer confection product with, for example four, five, six or eight layers, can be quickly and economically produced.

Furthermore, an apparatus is also provided which is suitable for the production of composite ice cream confection products according to the invention and has a plurality of extrusion nozzles, for example thin, slit-shaped extrusion nozzles, which are arranged or intended for extruding an extrudable confection material as successive thin layers on a conveyor belt or other moving substrate, said apparatus possibly also being equipped, either between the extrusion nozzles or in the outlet of each extrusion nozzle, with couverture-spray outlets or other supply outlets which are arranged and intended for spraying or supplying the couverture material on to the corresponding extruded layer of ice cream material on the conveyor belt, before it is covered with a subsequent extruded layer.

One embodiment of the product produced according to the invention is a composite confection product having a plurality of thin layers of an extruded ice cream confection material, said layers being separated from one another by layers of a couverture material, preferably sprayed on. In particular examples of the products some or all of the thin extruded layers are made with a decorative pattern.

The finished structured confection product is then moved into a cooling tunnel (hardening apparatus) and cooled to the storage temperature of about −20° or −30° C.

BRIEF DESCRIPTION OF THE DRAWINGS

The diagrammatic drawings of FIGS. 1, 2 and 3 and the following description show, solely by way of example, embodiments of the invention.

DETAILED DESCRIPTION OF PREFERRED EMBODIMENTS OF THE INVENTION

Figure 1:
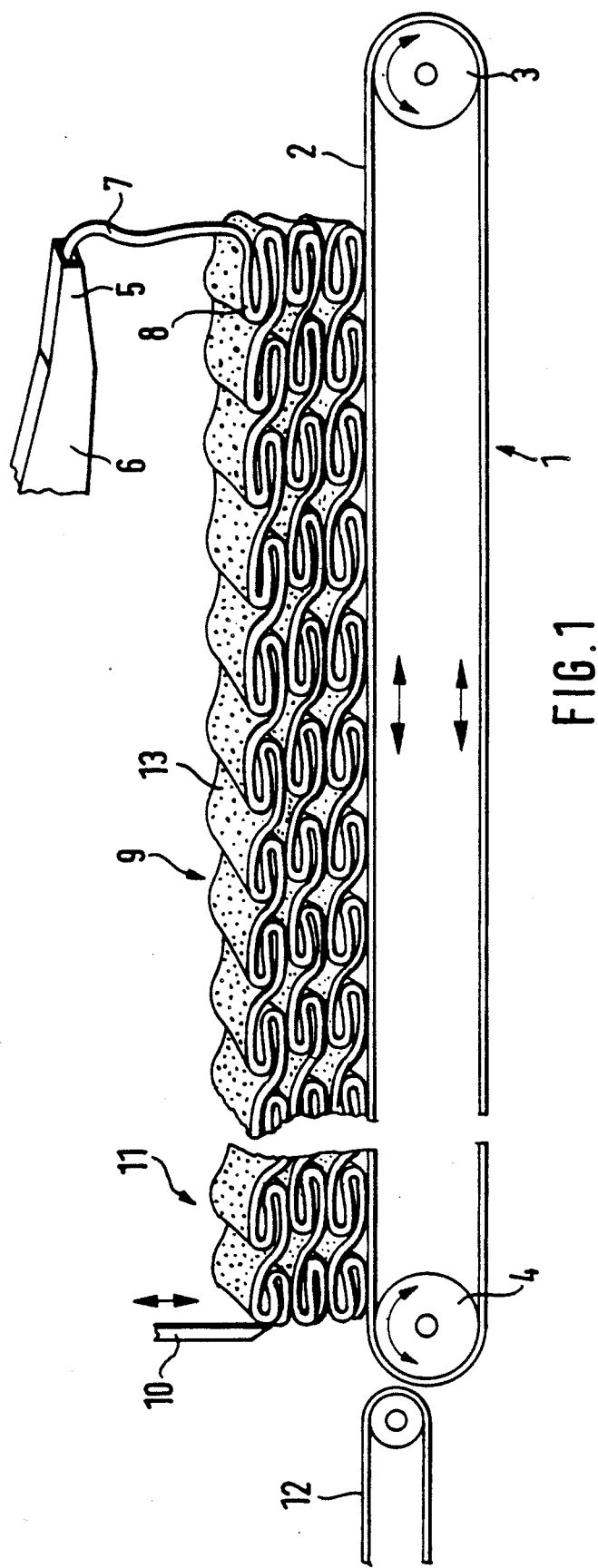
FIG. 1 shows a diagrammatic view of an apparatus for producing confection products according to the invention.

The apparatus shown in FIG. 1 has a conveyor belt 1 with an endless belt 2 which is stretched between two transport rollers 3, 4. At least one of the transport rollers 3 or 4 is moved by a driving apparatus (not shown) for example a geared electric motor. The component of movement can be in both directions of the arrow. The drive can be either continuous at an extremely low speed or stepwise. In the case of continuous operation the transport rollers are driven at a constant speed. Arranged above the carrying run of the endless belt 2 is an extrusion nozzle 5 having a slit-shaped outlet opening. The outlet opening lies parallel to the plane of the belt 2. The feed side 6 of the nozzle 5 is connected via a line (not shown), for example a hose pipe, to a distributor head, likewise not shown. The distributor head has a main supply line which for its part leads directly to a pressurized ice cream delivery source, for example an extruder. The nozzle 5 is fixed to a supporting plate (not shown). The extrusion nozzle 5 can be adjusted in height relative to the conveyor belt 1 and it can also be attached together with other nozzles (not shown) to a carrier (not shown) which can be pivoted relative to the conveyor belt. A spray nozzle can be arranged behind the extrusion nozzle 5. The confection material is extruded from the extrusion nozzle 5 in the form of a pasty mass, for example of ice cream, while finely powdered material, for example chocolate chips, is sprayed from the spray nozzles (not shown).

To operate the apparatus ice cream under pressure is delivered to the main supply line. This ice cream is distributed via the distributor head and the lines to the nozzle 5.

The method of operating the above-mentioned apparatus is as follows:

The conveyor belt is continuously displaced laterally at an extremely low speed. A tray can be placed on the conveyor belt 1 in front of the extrusion nozzle 5. Confection material, for example aerated ice cream, is now delivered from the distributor head through lines to the extrusion nozzle 5 and issues therefrom with a constant component of movement. The component of movement of the material being extruded is greater than the movement of the conveyor belt. Deposition of a first layer of ice cream extrudate on to the substrate occurs as follows:

A first point of deposition of the leading end of the strand issuing from the extrusion nozzle 5 is displaced laterally relative to the vertical delivery movement of the extrusion strand to the depositing plane of the conveyor belt 2 so that the pasty confection material is deposited laterally under its own weight due to a lateral displacement of the centre of gravity of the strand 7. Thereafter the conveyor belt 2 is displaced laterally when at least one loop 8 with at least two superimposed strand sections has been formed. The extent of the lateral displacement is the amount l (see FIGS. 2 and 3) of the first loop width of the delivered extrusion strand. As the process continues a plurality of loops are deposited continuously so that they overlap and a first layer of ice cream extrudate is deposited on the conveyor belt 2. The conveyor belt is then moved forward and a second nozzle device is brought into use. While this second nozzle device is applying the second strandshaped layer of extrudate a fresh base plate is moved under the first nozzle device and the process is begun anew. In this way, with a production line that can be extended at will, a multilayer confection product, for example with four layers, can be produced. The resulting confection strand 9, shown diagrammatically, can be cut into lengths at the end of the belt 2 by a vertically reciprocating cutting device 10 located there to form confection product pieces 11 which can be taken away by a further conveyor belt 12. Continuous layers or separate individual particles 13, for example chocolate chips, can be sprayed on by spray nozzles (not shown). At the end of the machine line a further nozzle device may be provided for the purpose of forming a final crown of couverture or cream on the confection product.

As already mentioned, the shaped bodies produced in such a line are then moved into a hardening tunnel (deep-freezing-tunnel) where they are rapidly shock-cooled to storage temperatures of about −30° C.

Figure 3:
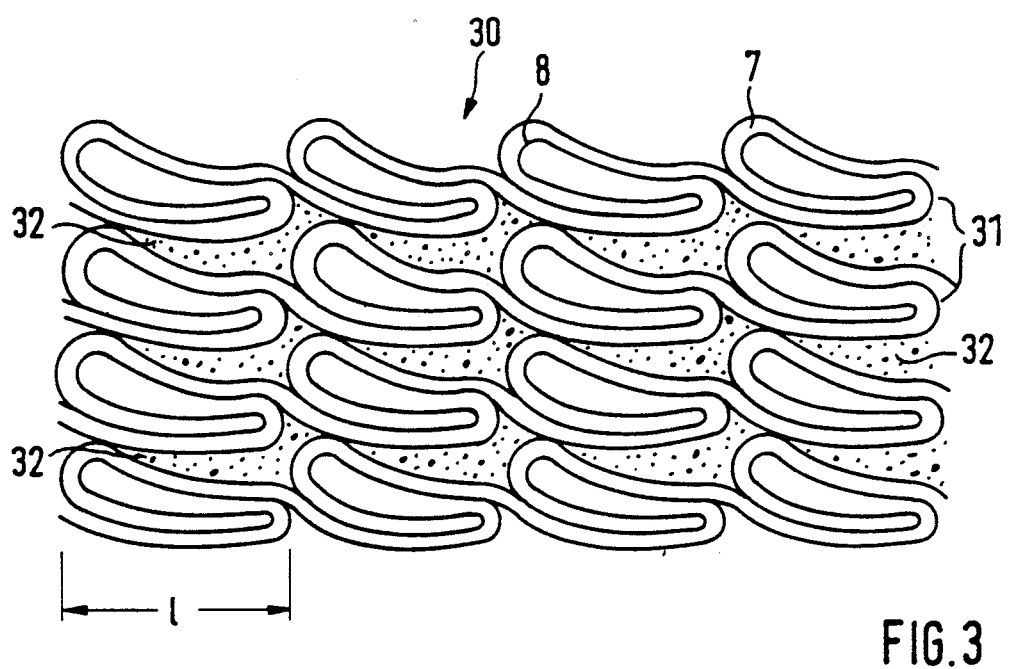
FIG. 3 shows a side view of an example of a confection product produced by the process according to the invention.

The composite confection product shown in FIG. 3 is indicated as a whole by 30. It consists of extruded strands 7 of ice cream which are deposited in loops in the form of waves going back and forth, extending in the plane of each confection layer 31. The wave-shaped loops 8 of the strands are laid down in superimposed confection layers 31 so that they overlap themselves. Between each of the confection layers 31 there is a thin separating layer 32 which can consist of chocolate couverture, nougat, chocolate pieces or the like.

Figure 2:
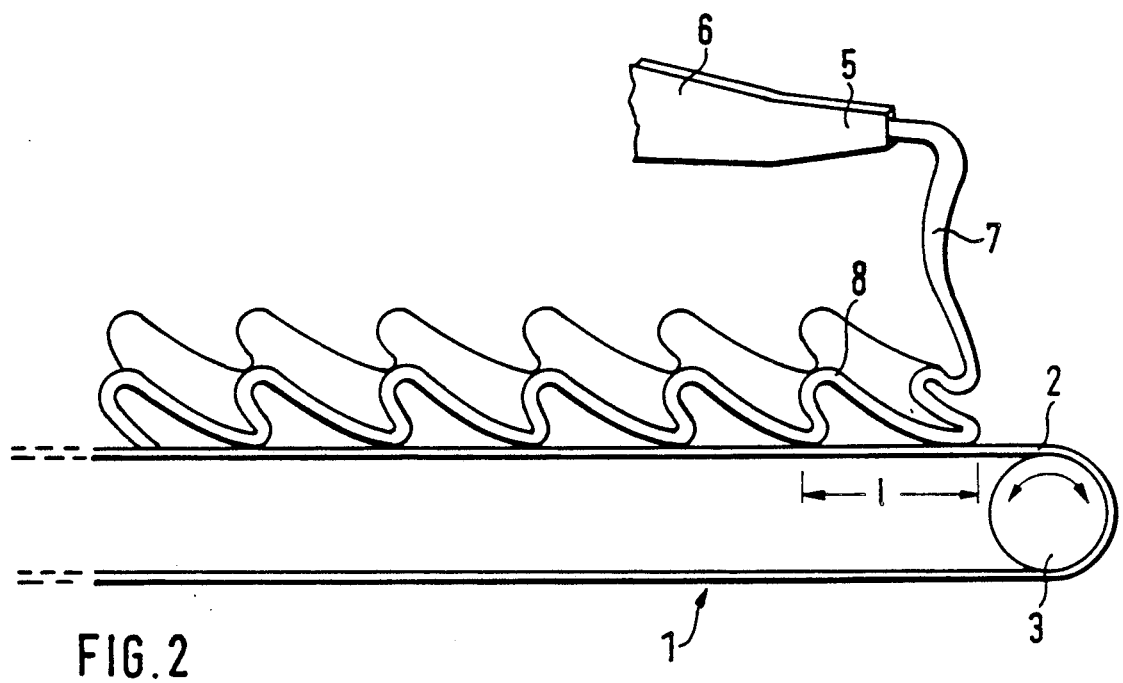
FIG. 2 shows a diagrammatic view of an apparatus for producing confection products according to the invention.

In the exemplary embodiments shown in FIGS. 1, 2 and 3 the flat strands 7 have a rectangular cross-section. However, any other cross-sections can be chosen instead. Round, oval, triangular or star-shaped cross-sections are preferred.

FIG. 2 shows an example of a confection material produced by the process according to the invention. As shown in FIG. 2 a first layer of ice cream extrudate is deposited on the conveyor belt. The strand 7 is deposited in loops in the form of waves that run back and forth, and extends in the plane of the confection layer. As can be seen in FIG. 2 the first confection layer of the resulting product is formed of at least one loop deposited with lateral displacement of the conveyor belt, whereby the extrusion strand is diverted and the continuing strand is deposited beneath the adjacent loop.

All technical details mentioned in the patent claims, the description and the drawings form part of the invention both individually and in any combination.

What is claimed is:

1. A process for producing a composite frozen confection product comprising a plurality of superimposed layers formed from extruded strands of an aerated extrudable frozen confection material, at least one of which is wave-shaped and overlaps itself, which comprises: extruding at least one strand of said frozen confection material on to a conveyor belt, laterally displacing the leading end of the strand issuing from at least one extrusion nozzle relative to the vertical outlet movement of the extrusion strand in order to produce the wave shape and wherein the component of movement of the material being extruded is greater than the movement of the conveyor belt, depositing said extrusion strand laterally under its own weight on the conveyor belt due to the lateral displacement of the centre of gravity of the strand and the strand section already deposited in a loop going back and forth, and displacing the conveyor belt laterally stepwise at the latest when at least one loop having at least two superimposed strand sections has been formed.

2. A process according to claim 1 wherein after a first point of deposition of the extrusion strand that has issued has been established and after the first loop has been deposited the conveyor belt is displaced laterally stepwise by the width of the first loop.

3. A process according to claim 1 wherein the conveyor belt is displaced stepwise after more than two loops have been deposited on top of one another.

4. A process according to claim 1 wherein, after a first point of deposition of the extrusion strand that has issued has been established and after the first loop has been deposited, the conveyor belt is displaced laterally stepwise by variable amounts relative to the width of the first loop.

5. A process according to claim 4 wherein the loops extending in a plane of a confection layer, are made from the same strand.

6. A process according to claim 1 wherein a plurality of superimposed overlapping confection layers are formed, each of said confection layers comprising loops extending in its plane.

7. A confection product produced according to claim 1 wherein the extruded strands have a rectangular cross-section, the strands are deposited in loops in the form of waves going back and forth which extend in the plane of each confection layer and the wave-shaped loops of the strands are deposited in superimposed confection layers so that they overlap themselves.

8. A confection product according to claim 7 wherein the confection layers are made of the same strand deposited continuously.

9. A confection product according to claim 7 wherein the confection layers of the confection product comprise various strands of different kinds of confection.

10. A confection product according to claim 7 wherein a strand of another kind of confection material is arranged parallel to and adjacent to each wave-shaped layer.

11. A confection product according to claim 10 wherein the other kind of confection material is a fatty base material selected from the group consisting of couverture, chocolate frosting or nougat.

12. A confection product according to claim 10 wherein the other kind of confection material is a loose, unevenly distributed confection material selected from the group consisting of chocolate pieces and chocolate chips.

13. A confection product according to claim 7 which includes intermediate layers less than 1 mm thick between the confection layers.

14. A confection product according to claim 13 wherein the intermediate layers are partly discontinuous.

15. A process product according to claim 1 wherein the confection product comprises at least one loop deposited with lateral displacement of the conveyor belt whereby the extrusion strand is cut into lengths and a continuing strand is deposited beneath the adjacent loop.

* * * * *